(12) United States Patent
Ahles et al.

(10) Patent No.: US 8,146,439 B2
(45) Date of Patent: Apr. 3, 2012

(54) SENSOR SYSTEM AND METHOD FOR MANUFACTURING A SENSOR SYSTEM

(75) Inventors: Marcus Ahles, Pfullingen (DE); Hubert Benzel, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 12/887,200

(22) Filed: Sep. 21, 2010

(65) Prior Publication Data

US 2011/0072906 A1 Mar. 31, 2011

(30) Foreign Application Priority Data

Sep. 30, 2009 (DE) .................. 10 2009 045 158

(51) Int. Cl.
*G01L 9/00* (2006.01)
*H05K 3/00* (2006.01)

(52) U.S. Cl. ................ 73/754; 73/756; 29/829
(58) Field of Classification Search .......... None
See application file for complete search history.

(56) References Cited

U.S. PATENT DOCUMENTS

| 2006/0118907 A1* | 6/2006 | Park | 257/532 |
| 2007/0228878 A1* | 10/2007 | Huang | 310/322 |
| 2011/0079081 A1* | 4/2011 | Weiss et al. | 73/514.32 |

FOREIGN PATENT DOCUMENTS

| DE | 102 26 034 | 12/2003 |
| DE | 10 2004 036 032 | 7/2005 |
| DE | 10 2004 036 035 | 7/2005 |
| WO | WO 02/02458 | 1/2002 |

\* cited by examiner

*Primary Examiner* — Andre Allen
(74) *Attorney, Agent, or Firm* — Kenyon & Kenyon LLP

(57) ABSTRACT

A sensor system, in particular a pressure sensor system, having a substrate having a main extension plane, the substrate having at least one trench on a first side, and the trench being provided to produce a diaphragm area on a second side of the substrate diametrically opposite to the first side perpendicularly to the main extension plane, and a decoupling element further being integrated in the material of the diaphragm area.

11 Claims, 3 Drawing Sheets

SENSOR SYSTEM AND METHOD FOR MANUFACTURING A SENSOR SYSTEM

BACKGROUND INFORMATION

Sensor systems are generally known. For example, a sensor and a method for manufacturing a sensor are known from German Patent No. DE 102 26 034, the sensor including a semiconductor material, which has a first thickness inside a diaphragm area and a second thickness outside the diaphragm area, the second thickness being greater than the first thickness. The semiconductor material has an open trench, which is defined by the lesser first thickness, on its rear side. The diaphragm area, which is implemented on a front side of the semiconductor material, is deformable perpendicularly to the semiconductor material as a function of a pressure differential between a first pressure on the front side and a second pressure, which is to be measured, in the trench, means for measuring the deformation of the diaphragm area being situated in the junction area between the first and the second thicknesses. This sensor system has the disadvantage that both a variation of the first pressure and also a variation of the second pressure directly result in a deformation of the diaphragm area. A pressure variation on the front side is thus detected as a measuring signal, although the second pressure has possibly remained constant. This has the result that the first pressure must be monitored using a separate absolute pressure sensor. In addition, further methods for manufacturing sensor systems are known from German Patent No. DE 10 2004 036 032, German Patent No. DE 10 2004 036 035, and PCT International Patent Publication No. WO 02/02458, in which firstly a porous layer is manufactured in a semiconductor substrate and subsequently a cavern is produced below the porous layer in the semiconductor substrate. The porous layer is subsequently closed again and the cavern is optionally provided with an access opening. This method is also referred to hereafter as the APSM process (advanced porous silicon membrane).

SUMMARY OF THE INVENTION

The sensor system according to the present invention and the method according to the present invention for manufacturing a sensor system have the advantage over the related art that mechanical decoupling of the diaphragm area from a second pressure on the second side of the substrate is achieved. This is accomplished in that the decoupling element is introduced into the material of the diaphragm area. A pressure variation of the second pressure thus does not result in a deflection movement of the diaphragm area perpendicularly to the main extension plane, but rather is instead absorbed by the decoupling element. A deflection movement of the diaphragm area perpendicularly to the main extension plane is advantageously exclusively caused by a variation of a first pressure in the trench, so that a detected deflection movement is uniquely to be assigned to this first pressure. The sensor system is thus usable as an absolute pressure sensor. The measuring precision of the sensor system is further increased overall and the impairment of the measuring precision by variations of the second pressure is reduced. Advantageously, a further absolute pressure sensor or a further reference volume is thus not required, so that costly capping of the sensor system or the second side of the substrate may be dispensed with. The integration of the decoupling element in the diaphragm area further allows implementing a comparatively compact installation, and cost-effective manufacturing of the sensor system. The substrate preferably includes a semiconductor substrate and particularly preferably a silicon substrate.

According to a preferred specific embodiment, it is provided that the decoupling element includes a cavern, the cavern preferably being smaller along the main extension plane than the diaphragm area and/or the diaphragm area having a further diaphragm area in the area of the cavern. A comparatively cost-effective implementation of a decoupling element is thus advantageously implemented. A pressure variation of the second pressure is absorbed by a decoupling movement of the further diaphragm area perpendicularly to the main extension plane, so that the action of a force on the diaphragm area perpendicularly to the main extension plane is prevented. A vacuum, which damps the decoupling movement in the desired manner, is preferably hermetically enclosed inside the cavern. The further diaphragm area has a lower material thickness in comparison to the diaphragm area, in particular perpendicularly to the main extension plane. The further diaphragm area preferably includes an APSM diaphragm (advanced porous silicon membrane). The diaphragm area and/or the further diaphragm area include a round or polygonal, preferably square cross-section parallel to the main extension plane in particular.

According to a preferred specific embodiment, it is provided that detection elements and/or an analysis circuit are placed in the area of the second side, the detection elements preferably including piezoresistive elements. The analysis of the detected deflection movement is significantly simplified in comparison to the related art, because only one single signal path, which stands for the deflection of the diaphragm area, is to be analyzed. Complex differentiation between a deflection of the diaphragm area and a measuring signal of a separate absolute pressure sensor is not necessary. The piezoresistive elements are preferably connected in a simple bridge circuit, such as a Wheatstone bridge. The analysis circuit includes a digital and/or analog circuit in particular, which is preferably introduced as an integrated circuit in the substrate and/or is implemented on an external chip, for example, an ASIC (application-specific integrated circuit).

According to a preferred specific embodiment, it is provided that the detection elements are situated along the main extension plane inside the diaphragm area and outside the decoupling element, the detection elements being spaced apart from the decoupling element in particular along the main extension plane. The detection elements are thus advantageously not interfered with by a decoupling movement of the further diaphragm area. The detection elements thus exclusively detect the deflection movement of the diaphragm area.

According to a preferred specific embodiment, it is provided that the trench is provided extending essentially perpendicularly to the main extension plane from the first side up to the first diaphragm area. The sensor system thus advantageously has a comparatively high media resistance, because the first pressure to be measured is supplied to the diaphragm area through the trench from the first side of the substrate, in particular the rear side of the substrate, so that a pressure measurement of aggressive media is advantageously achievable.

According to a preferred specific embodiment, it is provided that a glass base is provided on the first side, the glass base preferably having a channel which is connected to the at least one trench. The sensor system is preferably integrated in a pressure sensor housing, which includes a pressure connecting piece and preferably an attached lid, and optionally a plug connection for the electrical contact of the sensor system (for example, screw-in sensors having threaded connecting pieces).

A further object of the present invention is a method for manufacturing a sensor system, the substrate being provided in a first manufacturing step, the decoupling element being manufactured in a second manufacturing step, and the trench being manufactured in a third manufacturing step. The sensor system is thus producible comparatively cost-effectively, standard micromechanical manufacturing methods (preferably in surface micromechanics), for example, in 200 mm technology, being usable in particular.

According to a preferred specific embodiment, it is provided that in a fourth manufacturing step, the detection elements and/or the analysis circuit are placed in the area of the second side. The detection elements and/or the analysis circuit may advantageously be manufactured cost-effectively and using a comparatively compact installation space in standard semiconductor manufacturing methods.

According to a preferred specific embodiment, it is provided that the second manufacturing step includes a first and a second partial step, a porous sacrificial layer being produced in the substrate in the first partial step and the decoupling element being produced in the form of a cavern using a deposition procedure in the second partial step, the second manufacturing step preferably being performed from the second side. The decoupling element is thus preferably manufactured comparatively cost-effectively in APSM technology (advanced porous silicon membrane) in the second manufacturing step. The deposition procedure preferably includes the deposition of a cover layer, in which the further diaphragm area is produced, for example.

According to a preferred specific embodiment, it is provided that in the third manufacturing step, the trench is manufactured from the second side in an etching procedure, in particular in a trenching process. The trench is preferably manufactured using bulk micromechanical processes, such as trenching or anisotropic etching, for example, using KOH or TMAH.

DETAILED DESCRIPTION

Figure 1:
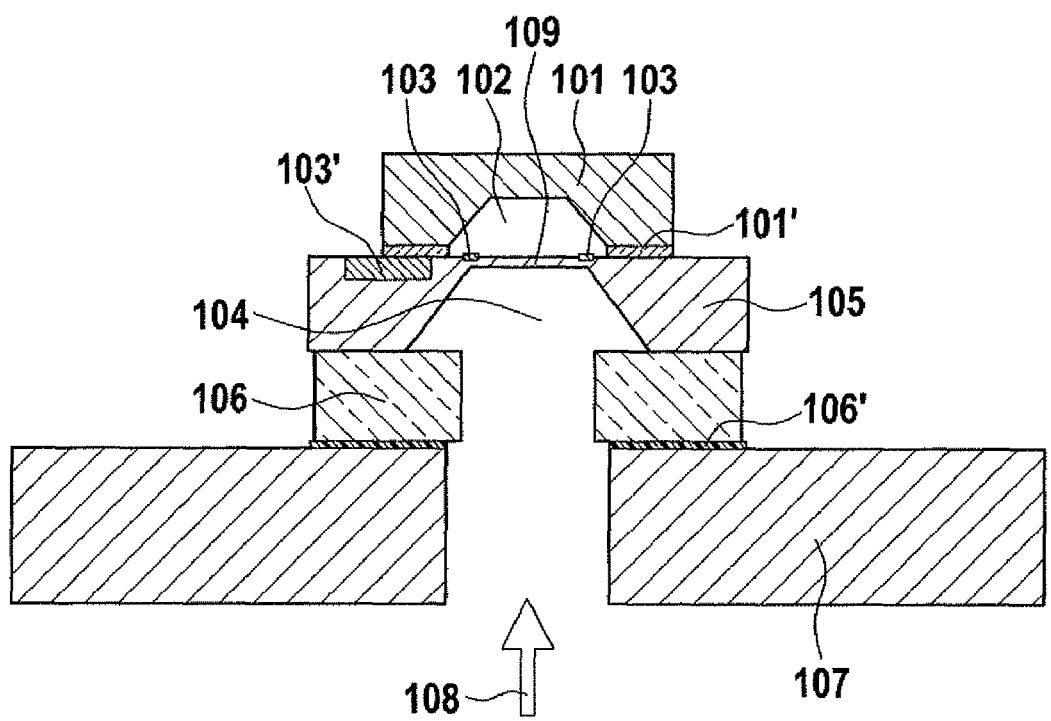
FIG. 1 shows a schematic sectional view of a sensor system according to the related art.

A schematic side view of a sensor system according to the related art having a sensor substrate 105, a sensor cavern 104, and a sensor diaphragm 109, is shown in FIG. 1, sensor substrate 105 being connected to a glass base 106, glass base 106 being glued on a circuit board 107 using an adhesive 106'. Circuit board 107 and glass base 106 each have an opening, so that a pressure 108 reaches sensor cavern 104 from a bottom side of circuit board 107 and sensor diaphragm 109 is deformed as a function of pressure 108 and as a function of a reference pressure 102. This deformation is measured using piezoresistors 103 on the top side of sensor diaphragm 109 and analyzed using an analysis circuit 103'. The top side of sensor diaphragm 109 has a hermetically sealed cap 101, which functions to set known reference pressure 102. The absolute value of pressure 108 may be determined using the relative measurement between reference pressure 102 and pressure 108 by setting known reference pressure 102 on the rear side of diaphragm 109. Cap 101 is fixedly connected to sensor substrate 105 via seal glass connections 101'.

Figure 2:
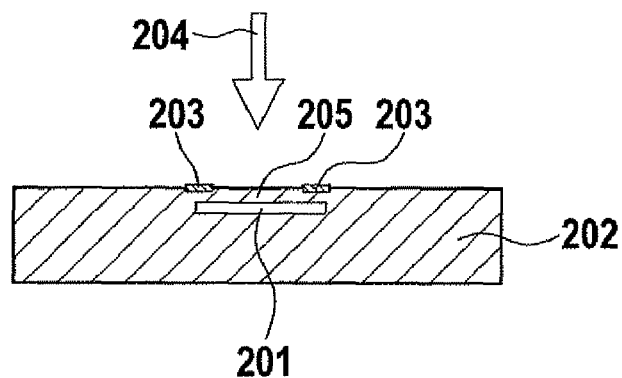
FIG. 2 shows a schematic sectional view of a further sensor system according to the related art.

A schematic side view of a further sensor system according to the related art is shown in FIG. 2, the further sensor system having a substrate 202 and a cavern 201 in substrate 202. Cavern 201 is situated closer to the top side of substrate 202 and is manufactured in particular in APSM technology. A diaphragm 205 is thus implemented between cavern 202 and the top side of substrate 202, which deforms as a function of the relative pressure between a pressure 204 on the top side of diaphragm 205 and a reference pressure in cavern 201, this deformation being measured using piezoresistors 203 on the top side of substrate 202. Cavern 202 has a vacuum in particular.

Figure 3:
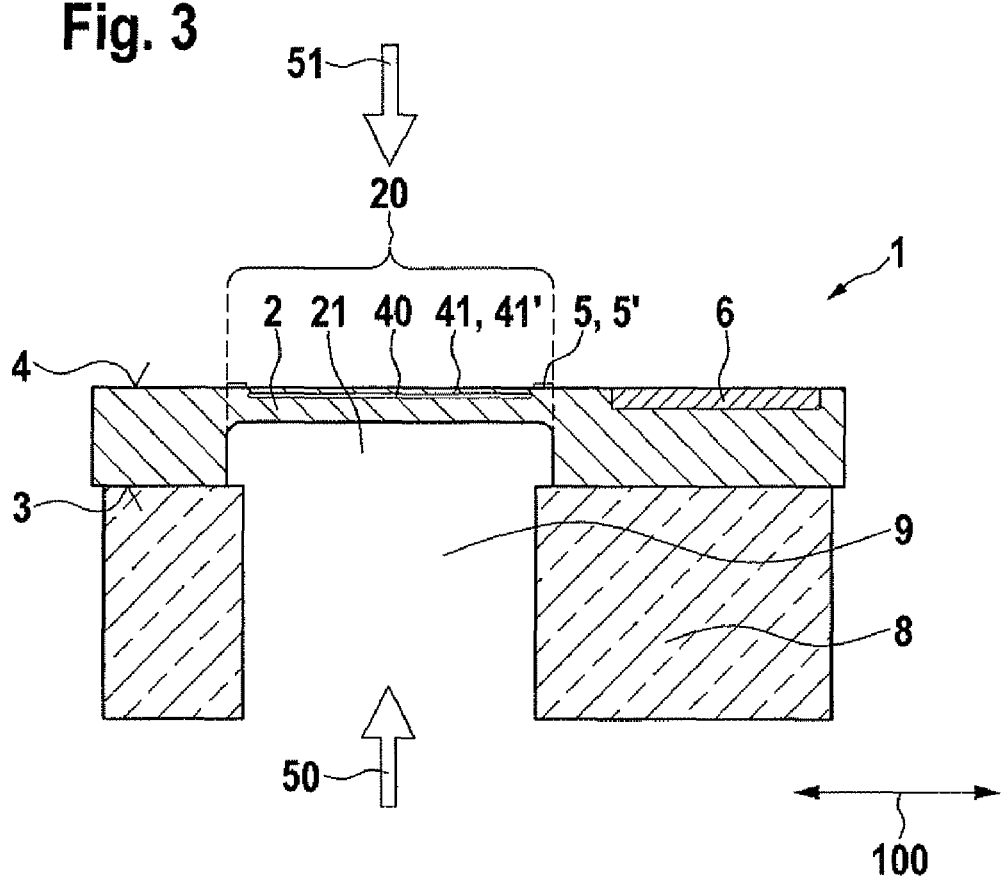
FIG. 3 shows a schematic sectional view of a sensor system according to a first specific embodiment of the present invention.

A schematic side view of a sensor system 1 according to a first specific embodiment of the present invention is shown in FIG. 3, the sensor system having a substrate 2 having a main extension plane 100. On a first side 3, substrate 2 has a trench 21, which defines a diaphragm area 20 on a second side 4, which is diametrically opposite to first side 3 perpendicularly to main extension plane 100. Diaphragm area 20 has a significantly reduced thickness perpendicularly to main extension plane 100 in relation to remaining substrate 2. Trench 21 extends perpendicularly to main extension plane 100 from first side 3 up to diaphragm area 20. A decoupling element 41, which includes a cavern 41', is integrated in the material of diaphragm area 20. The extension of cavern 41 parallel to main extension plane 100 is less than the extension of diaphragm area 20 parallel to main extension plane 100. Cavern 41 defines a further diaphragm area 40 on second side 4 of substrate 2 and inside diaphragm area 20. The thickness of further diaphragm area 40 perpendicular to main extension plane 100 is significantly less than the thickness of diaphragm area 20. Sensor system 1 further includes detection elements 5, which are situated parallel to main extension plane 100 inside diaphragm area 20 and only outside further diaphragm area 40. Detection elements 5 include piezoresistive elements 5' for measuring a deformation of diaphragm area 20, which results from a pressure differential between a first pressure 50 in trench 21 and a second pressure 51 on second side 4 of substrate 2. Second pressure 51 preferably includes a vacuum, so that the deformation of diaphragm area 20 is directly proportional to first pressure 50. Furthermore, cavern 41' is evacuated in particular, so that a variation of second pressure 51 is absorbed by a deformation of further diaphragm area 40 and does not result in a deformation of diaphragm area 20. For analyzing piezoresistive elements 5', sensor system 1 further includes an integrated analysis circuit 6, which is electrically connected to piezoresistive elements 5', a deformation of piezoresistive elements 5' causing a change of the electrical resistance of piezoresistive elements 5' and thus only a voltage and/or current signal being generated by diaphragm area 20 as a function of the relative pressure between first and second pressures 50, 51' during the relative pressure measurement between first and second pressures 50, 51'. A measurement of the deformation of further diaphragm area 40 is not required and is thus also not implemented. First side 3 of substrate 2 is further connected to a glass base 8, which has a channel 9 in the area of cavern 21, through which first pressure 50 is applied to diaphragm area 20. Trench 21 is implemented as a trough trench, for example.

Figure 4:
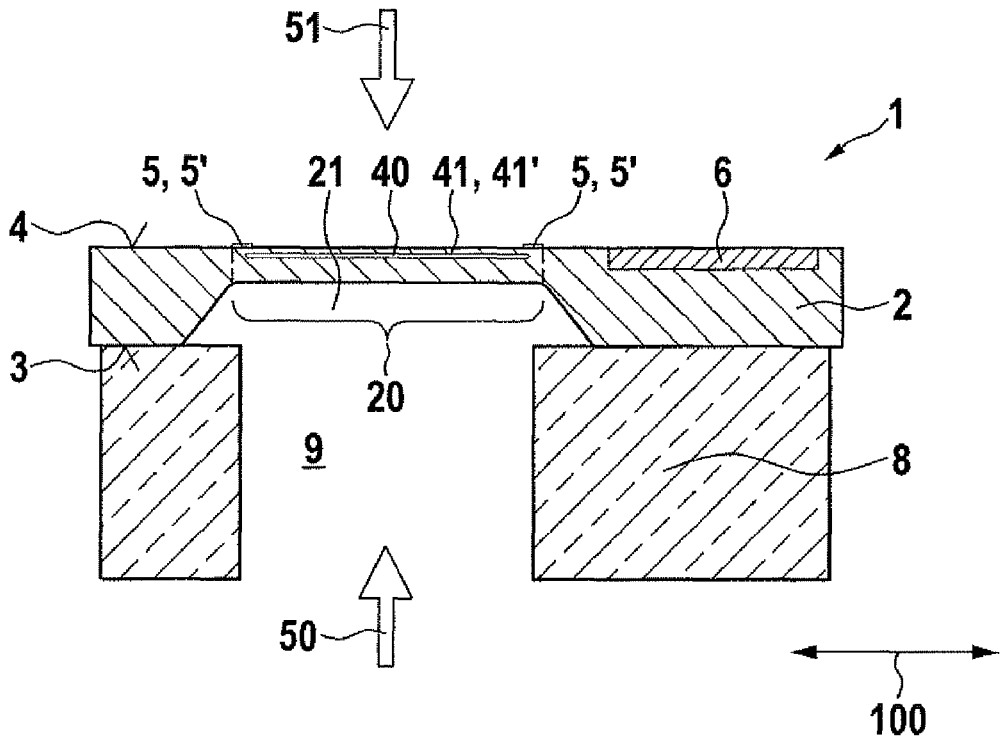
FIG. 4 shows a schematic sectional view of a sensor system according to a second specific embodiment of the present invention.

A schematic sectional view of a sensor system 1 according to a second specific embodiment of the present invention is shown in FIG. 4, the second specific embodiment essentially corresponding to the first specific embodiment of the present invention illustrated in FIG. 3, trench 21 not being manufactured by a trenching process, but rather by an anisotropic etching procedure, for example, using KOH or TMAH as etching media.

Figure 5:
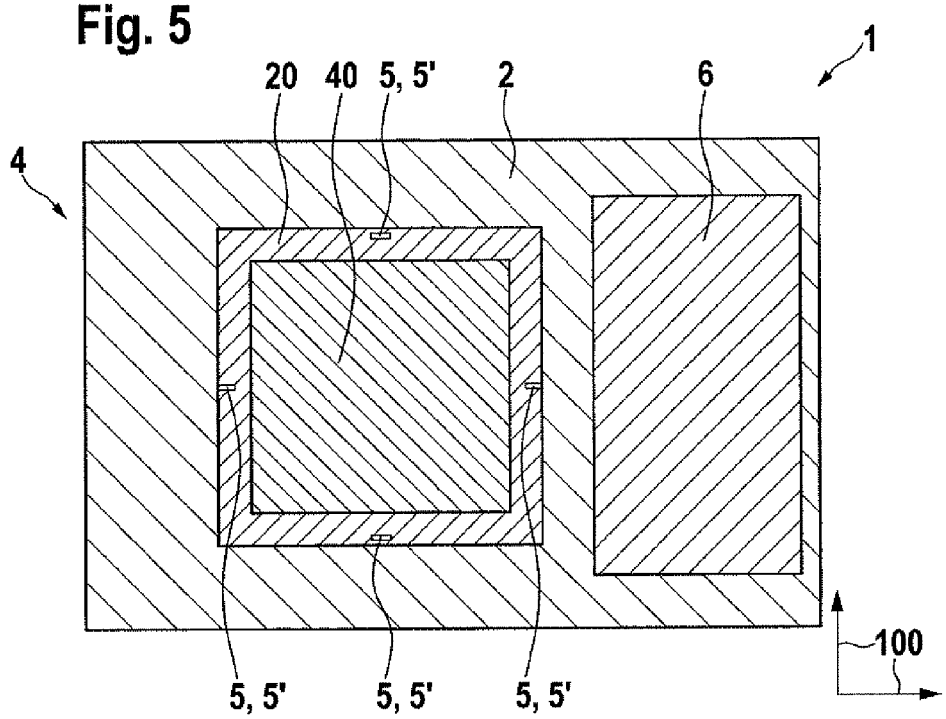
FIG. 5 shows a schematic top view of a sensor system according to a third specific embodiment of the present invention.

A schematic top view of a sensor system 1 according to a third specific embodiment of the present invention is shown in FIG. 5, the third specific embodiment essentially corresponding to the first specific embodiment of the present invention illustrated in FIG. 3, second side 4 of substrate 2, analysis elements 6, and diaphragm area 20 being visible in the top view. Diaphragm area 20 has a further diaphragm area 40, which is smaller than diaphragm area 20. Detection elements 5 are situated in the form of piezoresistive elements 5' inside diaphragm area 20 and outside further diaphragm area 40.

Figure 6:
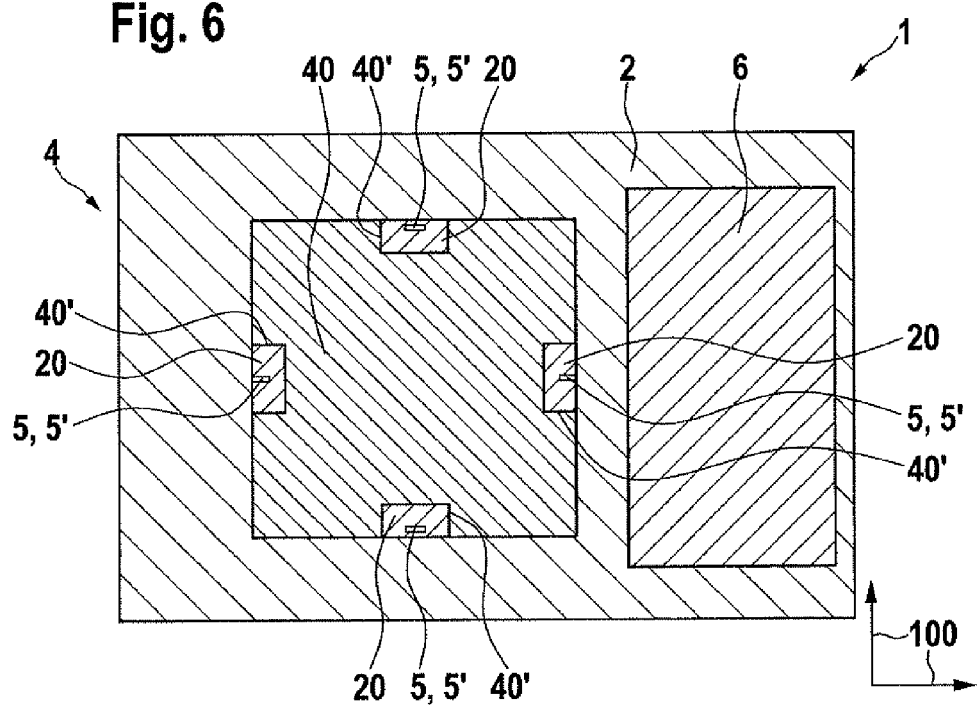
FIG. 6 shows a schematic top view of a sensor system according to a fourth specific embodiment of the present invention.

A schematic top view of a sensor system 1 according to a fourth specific embodiment of the present invention is shown in FIG. 6, the fourth specific embodiment essentially corresponding to the third specific embodiment of the present invention illustrated in FIG. 5, further diaphragm area 20 being congruent with diaphragm area 20, except for openings 40', and detection elements 5 being situated in the form of piezoresistive elements 5' inside openings 40'.

What is claimed is:

1. A sensor system comprising:
    a substrate having a main extension plane, the substrate having at least one trench on a first side, which is provided to produce a diaphragm area on a second side of the substrate, which is diametrically opposite to the first side perpendicularly to the main extension plane; and
    a decoupling element is integrated in a material of the diaphragm area.

2. The sensor system according to claim 1, wherein the sensor system is a pressure sensor system.

3. The sensor system according to claim 1, wherein the decoupling element includes a cavern, the cavern being smaller than the diaphragm area along the main extension plane, the diaphragm area having a further diaphragm area in an area of the cavern.

4. The sensor system according to claim 1, further comprising at least one of (a) detection elements and (b) an analysis circuit, situated in an area of the second side, the detection elements including piezoresistive elements.

5. The sensor system according to claim 1, wherein the detection elements are situated along the main extension plane inside the diaphragm area and outside the decoupling element, the detection elements being spaced apart from the decoupling element along the main extension plane.

6. The sensor system according to claim 3, wherein the trench extends substantially perpendicularly to the main extension plane from the first side up to the further diaphragm area.

7. The sensor system according to claim 1, further comprising a glass base situated on the first side, the glass base having a channel, which is connected to the at least one trench.

8. A method for manufacturing a sensor system, comprising:
    providing a substrate in a first manufacturing step;
    manufacturing a decoupling element in a second manufacturing step; and
    manufacturing a trench in a third manufacturing step.

9. The method according to claim 8, further comprising placing at least one of (a) detection elements and (b) an analysis circuit in an area of a second side of the substrate in a fourth manufacturing step.

10. The method according to claim 8, wherein the second manufacturing step includes a first and a second partial step, a porous sacrificial layer being produced in the substrate in the first partial step, and the decoupling element being produced in the form of a cavern using a deposition procedure in the second partial step, the second manufacturing step being performed from a second side of the substrate.

11. The method according to claim 8, wherein the trench is manufactured from a second side of the substrate in an etching procedure, including a trenching process, in the third manufacturing step.

* * * * *